United States Patent [19]

Lickton

[11] Patent Number: 5,362,282
[45] Date of Patent: Nov. 8, 1994

[54] MASTER CHAIN LINK

[75] Inventor: Robert J. Lickton, Elmwood Park, Ill.

[73] Assignee: R.L.L. Limited, Elmwood Park, Ill.

[21] Appl. No.: 117,396

[22] Filed: Sep. 3, 1993

[51] Int. Cl.[5] ................................... F16G 15/06
[52] U.S. Cl. ................................ 474/220; 474/224; 59/85
[58] Field of Search .............. 474/206, 218–220, 474/223–225; 59/4, 5, 7, 79.3, 84, 85

[56] References Cited

U.S. PATENT DOCUMENTS

| D. 280,288 | 8/1985 | Lickton | 474/220 X |
|---|---|---|---|
| 283,653 | 8/1883 | Paxson | 74/251 R |
| 600,595 | 3/1898 | Pond . | |
| 610,583 | 9/1898 | Fox . | |
| 623,431 | 4/1899 | Schaefer | 474/206 X |
| 697,163 | 4/1902 | Palmros | 474/206 X |
| 717,975 | 1/1903 | Dodge | 74/255 R |
| 745,975 | 12/1903 | Sweany | 74/258 |
| 762,046 | 6/1904 | Gates . | |
| 847,235 | 3/1907 | Butler . | |
| 959,047 | 5/1910 | Belcher | 74/255 R |
| 1,098,870 | 6/1914 | Yates . | |
| 1,127,684 | 2/1915 | Seeberger | 74/254 |
| 1,939,986 | 12/1933 | Klaucke . | |

(List continued on next page.)

FOREIGN PATENT DOCUMENTS

| 526807 | 10/1921 | France . |
|---|---|---|
| 576163 | 8/1924 | France . |
| 60176 | 12/1891 | Germany . |
| 892987 | 9/1953 | Germany . |
| 9104685 | 6/1991 | Germany . |
| 204377 | 9/1965 | Sweden . |
| 263455 | 8/1949 | Switzerland . |
| 44 | of 1895 | United Kingdom . |
| 14782 | of 1895 | United Kingdom . |
| 185791 | 9/1922 | United Kingdom . |
| 211794 | 2/1924 | United Kingdom . |
| 526284 | 9/1940 | United Kingdom . |

OTHER PUBLICATIONS

Instruction Sheet, Shimano Link Lock Bicycle Chain, Shimano Industrial Co. Ltd., Osaka, Japan, printed in Japan.
Instruction Sheet, Super Link ® II, R.L.L. Ltd., River Forest, IL.
Advertisement, The MissingLink TM from KMC, Continental Chain Co., LaVorne, CA.
Advertisement for KMC Chain Link Model CL-573 (MissingLink TM), KMC Chain Industrial Co., LTD, Tainan Hsien, Taiwan, Bicycle Today, p. 590.
Brochure for Super Link TM, R.L.L. Limited, River Forest, IL.

*Primary Examiner*—Roger J. Schoeppel
*Attorney, Agent, or Firm*—Arnold, White & Durkee

[57] ABSTRACT

A reusable master chain link for a derailler chain comprises first and second parallel pins extending between first and second parallel plates. The first pin includes first and second heads at opposite ends thereof and the second pin also includes first and second heads at opposite ends thereof. The first and second plates have respective first and second apertures formed therein. The first and second apertures have respective narrow circular portions narrower than the respective first heads of the first and second pins. The narrow circular portions further include respective countersinks formed therein for receiving and substantially concealing the respective first heads of the first and second pins and substantially concealing the first heads within the respective narrow circular portions. The first and second apertures further include respective wide circular portions wider than the respective first heads of the first and second pins. The respective wide circular portions are connected to the respective narrow circular portions by an elongated slot to permit movement of the respective first heads therebetween. The respective second heads of the first and second pins are integrally connected by laser welds to the respective second and first plates.

19 Claims, 5 Drawing Sheets

U.S. PATENT DOCUMENTS

| | | | |
|---|---|---|---|
| 1,985,032 | 12/1934 | Hoult | 24/208 A |
| 2,248,189 | 7/1941 | Pierce | 74/254 |
| 2,541,157 | 2/1951 | Fulke | 74/254 |
| 2,568,650 | 9/1951 | McIntosh et al. | 74/254 |
| 2,746,116 | 5/1956 | Craven | 74/254 |
| 2,780,830 | 2/1957 | Kammerer, Jr. | 74/254 |
| 2,846,746 | 8/1958 | Webster et al. | 24/265 AL |
| 3,379,072 | 4/1968 | Kuntzmann | 74/251 R |
| 3,421,313 | 1/1969 | Harada et al. | |
| 3,679,265 | 7/1972 | Krekeler | 74/250 R |
| 3,709,054 | 1/1973 | Montano | 474/220 |
| 3,847,031 | 11/1974 | Araya | 74/258 |
| 3,877,688 | 4/1975 | McCarty | 74/254 X |
| 3,885,445 | 5/1975 | Montano | 74/254 X |
| 3,939,721 | 2/1976 | Kuenzig et al. | 474/220 X |
| 3,969,949 | 7/1976 | Ohnishi | 474/230 |
| 4,041,790 | 8/1977 | Paul | 74/258 |
| 4,043,215 | 8/1977 | Long et al. | 74/258 |
| 4,143,512 | 3/1979 | Templin | 59/85 |
| 4,202,219 | 5/1980 | Weis | 474/223 |
| 4,978,327 | 12/1990 | Wu | 474/228 |
| 4,983,147 | 1/1991 | Wu | 474/206 |
| 5,178,585 | 1/1993 | Lin et al. | 474/206 |
| 5,291,730 | 3/1994 | Wu | 59/85 |
| 5,299,416 | 4/1994 | Wu | 474/218 X |
| 5,305,594 | 4/1994 | Wang | 474/206 X |

MASTER CHAIN LINK

FIELD OF THE INVENTION

The present invention relates generally to chains for use on bicycles and, more particularly, relates to a master chain link for a bicycle derailleur chain which minimizes the possibility of accidental disassembly, which is manually disassembled without using special tools, and which is reusable.

BACKGROUND OF THE INVENTION

A typical multiple-gear bicycle includes a derailleur chain driven around one of a pair of front sprocket wheels and one of a plurality of rear sprocket wheels. The derailleur chain is composed of alternating outer pin links and inner roller links. To laterally move the derailleur chain between the front sprocket wheels and the rear sprocket wheels, the bicycle is provided with respective front and rear derailleurs. The front derailleur typically includes a pair of elongated parallel guide plates. The derailleur chain is disposed between the guide plates, and the chain moves in a direction generally orthogonal to the length of the guide plates.

The front derailleur contacts the derailleur chain in a couple situations. First, in response to certain gear changes by manipulation of gear control levers, the guide plates laterally shift so that one of the guide plates contacts the chain. When this contact reaches a predetermined threshold, the front derailleur causes the chain to "derail" from one front sprocket wheel and to move to the other front sprocket wheel. Second, if the gear control levers are not locked into a gear, but rather are set in-between two gears, the guide plates will be misaligned. This will likely cause one of the guide plates to "rub" against the moving chain. The effect of derailleur contact with the derailleur chain is better understood by knowledge of how the chain is constructed.

Existing derailleur chains are generally composed of alternating outer pin links and inner roller links. Each of the inner roller links includes a pair of inner parallel plates connected by a pair of parallel hollow cylinders surrounded by cylindrical rollers. Each of the inner parallel plates contains a pair of apertures coinciding with and communicating with the hollow ends of the cylinders. Each of the outer pin links includes a pair of outer parallel plates connected by a pair of parallel pins. One of the pins interconnects with a hollow cylinder in one adjacent inner roller link, while the other of the pins interconnects with a hollow cylinder in the other adjacent inner roller link. It is this interconnection of pins to hollow cylinders which forms a chain. The ends of the chain are terminated by inner roller links.

To form a single continuous chain as it appears on a bicycle (hereafter "bicycle chain"), the inner roller links at the ends of chain are connected to one another by either a conventional outer pin link or by what is commonly referred to as a master link. The master link is an outer pin link specially designed to permit disconnection and removal of the bicycle chain from the bicycle. As most bicycle users know, it is very difficult to remove a bicycle derailleur chain without a master link from a bicycle. A bicycle user typically removes the bicycle derailleur chain for cleaning and greasing. Such chain removal is especially common amongst mountain bike users, where the chain can collect much dirt while riding.

Existing master links employ several designs for permitting disassembly of master links. One type of master link, described in U.S. Pat. No. 5,178,585 to Lin et al. and produced by Ta Ya Chain Co., Ltd., includes a pair of parallel outer plates and a pair of parallel pins extending between the plates with the opposite ends or heads protruding from the surfaces of the respective plates. The pins are secured to one of the plates, and detachably engaged to respective "figure-eight" holes in the other plate. To disassembly this type of master link, the chain plate containing the "figure-eight" holes is pushed inward relative to the adjacent roller links so as to "pop off" the chain plate.

In another type of master link, produced by KMC Chain Industrial Co., Ltd. under the mark "MISSINGLINK" TM, the master link includes first and second parallel outer plates and a pair of parallel pins extending between the plates. One of the two pin heads on one of the pins is fixedly attached to the first plate and the other pin head is detachably engaged to a peanut-shaped aperture in the second plate. Similarly, one of the two pin heads on the other pin is fixedly attached to the second plate and the other pin head is detachably engaged to a peanut-shaped aperture in the first plate. The pin heads protrude from the surfaces of the respective plates. To disassemble the master link., the second pin heads are simultaneously disengaged from their respective apertures by moving the plates in opposite directions.

A drawback of both of these types of master links is that they are not designed for reuse following diassembly. If either type of master link is reused, it is weaker than its original form and it presents a safety hazard due to damage caused to either the plates or pins during reassembly. The master link become significantly weaker with every assembly and disassembly. The weakened master link is now a weak point in the bicycle chain which increases the risk of tooth "skipping" on the sprocket wheels or bicycle chain breakage during riding. Because of this damage to the master link, it is generally recommended that the master link be replaced with a new master link following disassembly. Thus, the master link is not reusable if a master link in optimum working condition is desired.

Another drawback of these types of master links is that the protrusion of the pin heads from the plate surfaces presents a risk that one of the derailleurs, especially the front derailleur, may "catch" on a pin head and cause the bicycle chain to jam on the front derailler. More specifically, since the front derailleur contacts the chain during gear changes or improperly set gears, one of the guide plates may catch on a master link pin head and jam the bicycle chain on the front derailler, A further drawback of the chain link described in U.S. Pat. No. 5,178,585 to Lin et al. is that the lateral stress (side load) applied to the derailleur chain while riding may cause the master link to disassemble. This lateral stress results from the engagement of the derailleur chain with front and rear sprocket wheels which are not laterally aligned with one another, thereby causing the chain to flex. The possibility of accidental master link disassembly presents a safety hazard which should not be overlooked.

A need therefore exists to overcome the above-noted drawbacks associated with the foregoing types of master links.

SUMMARY OF THE INVENTION

A chain link comprises first and second parallel pins extending between first and second parallel plates. The first pin includes first and second heads at opposite ends thereof and the second pin also includes first and second heads at opposite ends thereof. The first and second plates have respective first and second apertures formed therein. The first and second apertures have respective narrow curvilinear portions narrower than the respective first heads of the first and second pins to prevent the respective first heads from passing therethrough. The narrow curvilinear portions further include respective countersinks formed therein for receiving and substantially concealing the respective first heads of the first and second pins. The first and second apertures further include respective wide curvilinear portions wider than the respective first heads of the first and second pins to permit the respective first heads to pass therethrough to disassemble the chain link. The respective wide curvilinear portions are connected to the respective narrow curvilinear portions to permit movement of the respective first heads therebetween. The respective second heads of the first and second pins are connected to the respective second and first plates.

Figure 1:
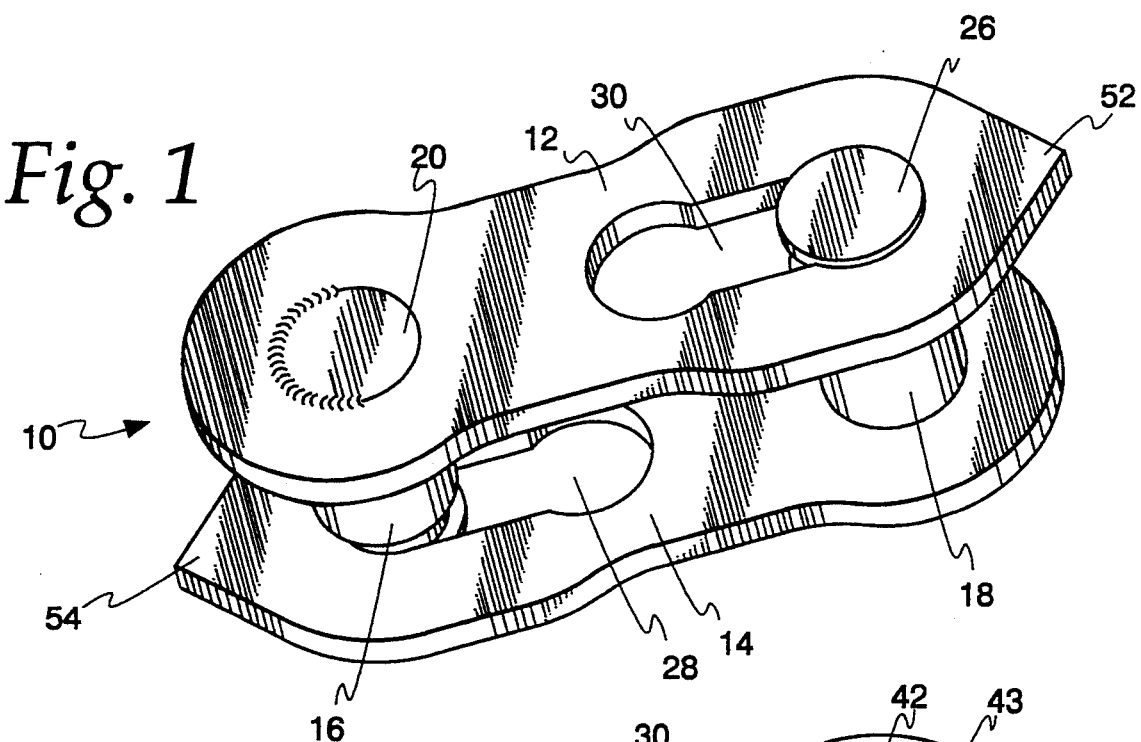
FIG. 1 is a perspective view of a master chain link embodying the present invention.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

DETAILED DESCRIPTION OF THE PREFERRED EMBODIMENT

Figure 2:
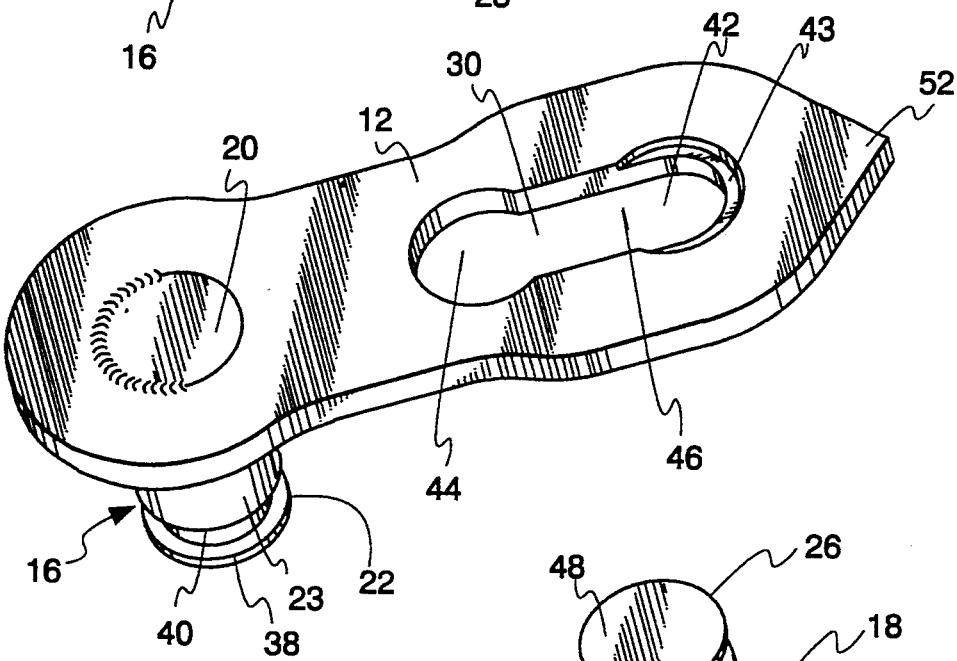
FIG. 2 is a perspective view of one of the two identical structures used to form the master chain link in FIG. 1.
Figure 3:
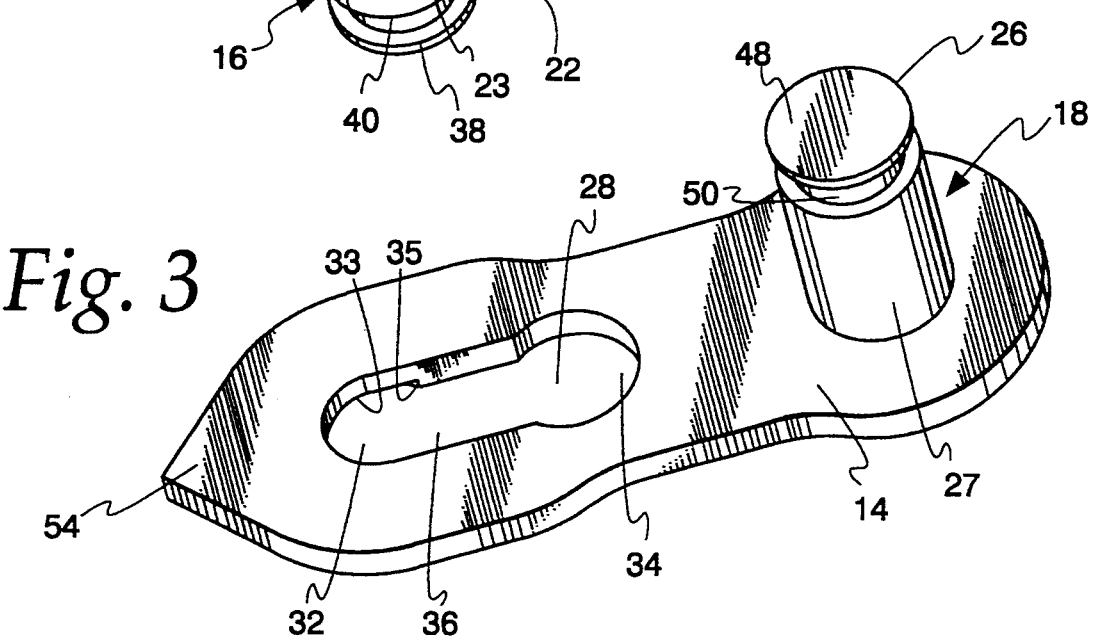
FIG. 3 is a perspective view of the other of the two identical structures used to form the master chain link in FIG. 1.
Figure 4:
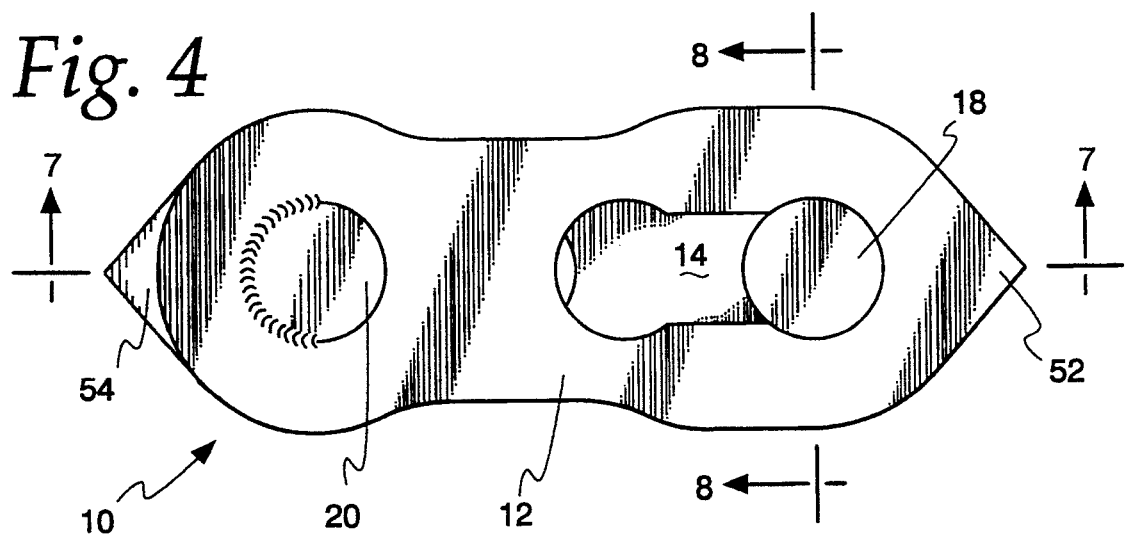
FIG. 4 is a top view of the master chain link in FIG. 1.

Turning now to the drawings, FIGS. 1-3 illustrate a master chain link 10 including a pair of elongated and parallel peanut-shaped plates 12, 14 and a pair of parallel pins 16, 18 connected therebetween. The pins 16, 18 are positioned orthogonal to the plates 12, 14. The pin 16 includes a pair of heads 20, 22 at opposite ends thereof and an elongated cylindrical body 23, and the pin 18 similarly includes a pair of heads 24, 26 at opposite ends thereof and an elongated cylindrical body 27. The heads 20, 24 are integrally connected to the respective plates 12, 14, while the heads 22, 26 are detachably interlocked within respective apertures 28, 30 formed in the respective plates 14, 12. It can be seen in FIG. 1 that the master link 10 is preferably formed from two identical integral structures. One of the structures is represented by the plate 12 and pin 16 (FIG. 2), and the other of the structures is represented by the plate 14 and the pin 18 (FIG. 3). To assemble the master link 10, these two structures are first oriented as mirror, flipped images of one another and then detachably interconnected to one another. The assembly and disassembly of the master link 10 is described in greater detail below.

The aperture 28 includes a narrow circular portion 32 surrounded by a countersink 33, a wide circular portion 34, and an elongated slot 36 connecting the narrow circular portion 32 to the wide circular portion 34 (FIG. 3). In the assembled form of the master link 10, the head 22 of the pin 16 is constructed and arranged to detachably engage the narrow circular portion 32 of the aperture 28 (FIGS. 2 and 3). More specifically, the head 22 includes a widened cylindrical tip 38 and a slotted cylindrical portion 40 positioned between the body 23 and the tip 38. In the assembled form, the slotted cylindrical portion 40 is positioned within the narrow circular portion 32, and the widened tip 38 is positioned substantially within the countersink 33. As shown in FIG. 3, the countersink 33 extends more than half-way around the periphery of the tip 38. Because the peripheral coverage of the tip 38 is more than semi-circular, the end portions 35 of the countersink 33 prevent longitudinal movement of the tip 38 into the elongated slot 36 while the tip 38 is positioned substantially within the countersink 33. Thus, the countersink 33 positively positions the head 22 at the narrow circular portion 32 in the assembled form of the master link 10.

Figure 5:
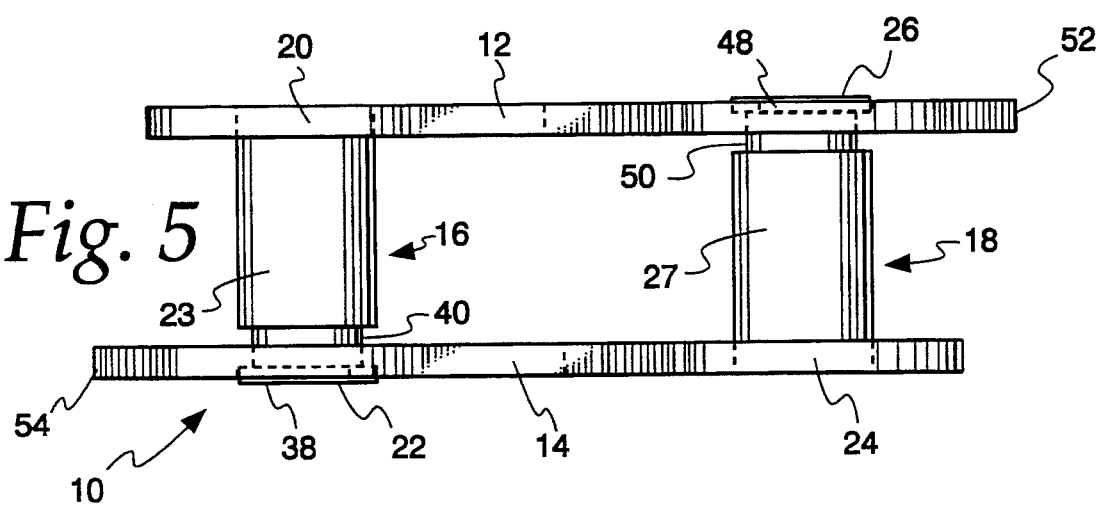
FIG. 5 is a side view of the master chain link in FIG. 1.
Figure 6:
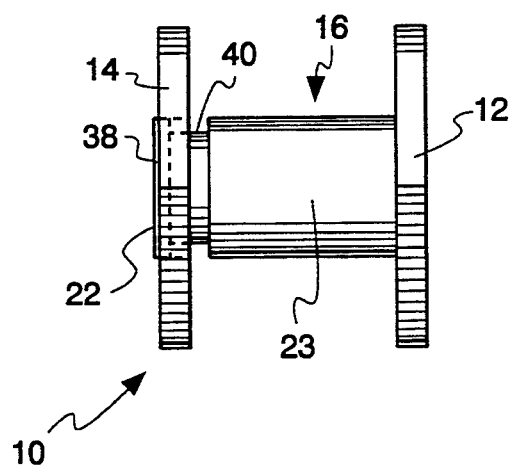
FIG. 6 is an end view of the master chain link in FIG. 1.

The tip 38 of the pin head 22 is diametrically sized larger than the diameter of the narrow circular portion 32 to prevent the head 22 from laterally passing therethrough (FIGS. 5 and 6). At the same time, the tip 38 is diametrically sized smaller than the diameter of the countersink 33 so that the tip 38 fits within the countersink 33. The tip 38 has a depth which is only slightly larger than the depth of the countersink 33 so that the tip 38 is substantially flush with the outer surface of the plate 14. In the preferred embodiment, the tip 38 of the head 22 has a depth of 0.014 inches, and the countersink 33 has depth of 0.010 inches. Therefore, all but 0.004 inches of the tip 38 is concealed within the countersink 33. The tip 38, however, may be designed with less depth so that it is completely concealed within the countersink 33.

Figure 7:
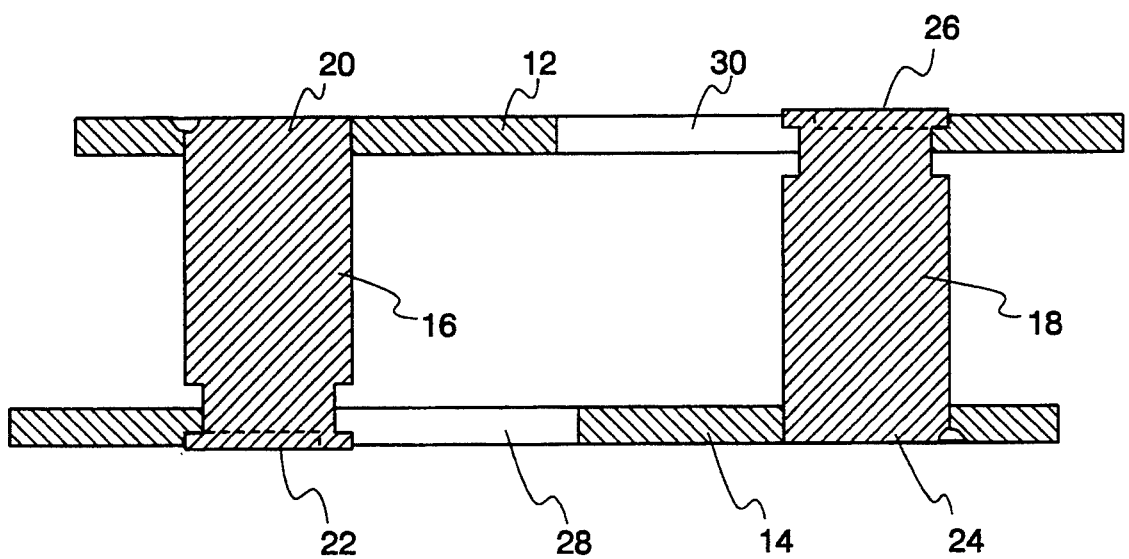
FIG. 7 is a section taken generally along the line 7—7 in FIG. 4.

To prevent the elongated cylindrical body 23 of the pin 16 from laterally passing through the narrow circular portion 32, the body 23 is diametrically sized larger than the diameter of the narrow circular portion 32 (FIGS. 5 and 6). Furthermore, the slotted cylindrical portion 40 of the pin head 22 is diametrically sized slightly smaller than the diameter of the narrow circular portion 32 to permit longitudinal movement of the slotted portion 40 out of the narrow circular portion 32. The depth of the slotted portion 40 is slightly greater than the depth of the plate 14 to permit lateral movement of the tip 38 above the plane of the outer surface of the plate 14 (FIGS. 5-7). This allows the tip 38, which is situated substantially within the countersink 33 in the assembled form of the master link 10, to be laterally shifted out of the countersink 33. After shifting the tip 38 out of the countersink 33, the slotted portion 40 of the pin head 22 may be longitudinally moved through the elongated slot 36 with the tip 38 abutting the outer surface of the plate 14 adjacent the elongated slot 36.

Since the structure of the pin 18 and associated aperture 30 is preferably identical to the structure of the pin 16 and associated aperture 28 (FIGS. 2 and 3), it will not be described herein in detail. It suffices to say that the aperture 30 includes a narrow circular portion 42 surrounded by a countersink 43, a wide circular portion 44, and an elongated slot 46 connecting the narrow circular portion 42 to the wide circular portion 44. The head 26 includes a widened cylindrical tip 48 and a slotted cylindrical portion 50 positioned between the body 27 and the tip 48 (FIGS. 3 and 5).

Figure 8:
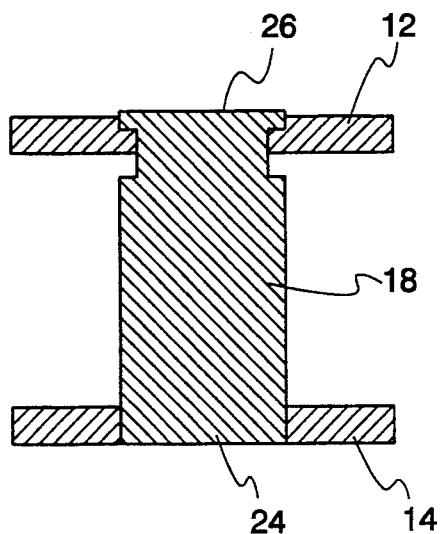
FIG. 8 is a section taken generally along the line 8—8 in FIG. 4.

In the assembled form of the master link 10, the slotted cylindrical portion 50 is positioned within the narrow circular portion 42, and the slotted portion 50 has a depth and diameter which allows reasonable play in both the lateral and longitudinal directions (FIGS. 5, 7, and 8). The widened tip 48 is positioned substantially within the countersink 43. Both the tip 48 and the pin body 27 are diametrically sized larger than the diameter of the narrow circular portion 42 to maintain the slotted portion 50 substantially within the narrow circular portion 42 and to prevent the tip 48 and the pin body 27 from laterally passing therethrough.

To disassemble the master link 10 and thereby disconnect the continuous bicycle chain, the pin slotted portions 40, 50 are simultaneously slid in opposite directions (toward one another) from the respective narrow circular portions 32, 42, through the respective elongated slots 36, 46, and into the respective wide circular portions 34, 44 (FIG. 1). In particular, the slotted portions 40, 50 are simultaneously slid from the respective narrow circular portions to the respective elongated slots 36, 46 by first laterally pushing the plates 12, 14 inwardly toward one another. This laterally shifts the slotted pin portions 40, 50 outwardly relative to the respective plates 14, 12 and laterally shifts the pin tips 38, 48 beyond the outer surface planes of the respective plates 14, 12.

With the tips 38, 48 free of the respective countersinks 33, 43, the plates 12, 14 are longitudinally pushed toward one another so that the slotted pin portions 40, 50 slide toward one another through the respective elongated slots 36, 46 and into the respective wide circular portions 34, 44. Since the tips 38, 48 are diametrically sized larger than the respective widths of the respective elongated slots 36, 46, the tips 38, 48 abut the respective outer surfaces of the respective plates 14, 12 at the periphery of the respective elongated slots 36, 46 during the sliding process. Once the slotted pin portions 40, 50 reach the respective wide circular portions 34, 44, the plates 12, 14 are laterally pulled outwardly away from one another. Since the respective diameters of the wide circular portions 34, 44 are greater than the respective diameters of the pin tips 38, 48, this simultaneous outward force applied to the plates 12, 14 causes the tips 38, 48 to pass through the respective wide circular portions 34, 44, thereby disassembling the master link 10.

The master link 10 is designed to prevent accidental disassembly of the master link 10 (e.g., while bicycle riding). One feature of the master link 10 which minimizes the possibility of accidental disassembly is that the tips 38, 48 of the respective pin heads 22, 26 are substantially concealed within the respective countersinks 33, 43 in the assembled form of the master link 10. Concealing the tips 38, 48 minimizes the possibility that either the front or rear derailleur of the bicycle carrying the master link 10 on its chain will contact the tips 38, 48 and destroy one of the pins 16, 18. As previously stated, it is common for the front derailleur to contact the chain during gear changes or improperly set gears.

In order to minimize the possibility of derailleur contact with the other pin heads 20, 24, the pin heads 20, 24 are integrally connected to the respective plates 12, 14 without the pin heads 20, 24 protruding outwardly from the respective plates 12, 14. In particular, the pin heads 20, 24 are fitted within respective circular apertures formed in the respective plates 12, 14. The diameters of the circular apertures substantially match the diameters of the respective pin heads 20, 24. Next, the pin heads 20, 24 are laser welded to the periphery of the respective circular apertures to create an integral connection therebetween. The use of laser welding avoids the problem of protruding heads caused by use of such other connection techniques as staking or pressing a protruding pin head against the periphery of the associated circular aperture.

Another feature of the master link 10 which minimizes the possibility of accidental disassembly is the use of the elongated slots 36, 46 between the respective narrow circular portions 32, 42 and the respective wide circular portions 34, 44. In the event the pin tips 38, 48 somehow become dislodged from the respective countersinks 33, 43 during bicycle riding, the pin tips 38, 48 must still traverse the respective elongated slots 36, 46 to the wide circular portions 34, 44 before they are able to pass through the apertures 28, 30 and disassemble the master link 10. In all likelihood, the tips 38, 48 would revert back into the respective countersinks 33, 43 following dislodgement instead of passing through the respective elongated slots 36, 46 into the wide circular portions 34, 44. Thus, the elongated slots 36, 46 act as safety nets which give the respective pin tips 38, 48 an opportunity to re-establish their proper position within the respective countersinks 33, 43 following accidental dislodgement.

Yet another feature of the master link 10 which minimizes the possibility of accidental disassembly is that the plates 12, 14 include respective pointed extensions 52, 54 at the respective outer ends thereof. The pointed extensions 52, 54 are integrally formed with the respective plates 12, 14, and the extensions 52, 54 are both located at the plate ends proximate to the respective apertures 30, 28. In the event of dislodgement of the pin tips 38, 48 from the respective countersinks 33, 43 while bicycle riding, the extensions 52, 54 limit the available range of longitudinal movement of the respective plates 12, 14 relative to the respective pins 18, 16.

Figure 9:
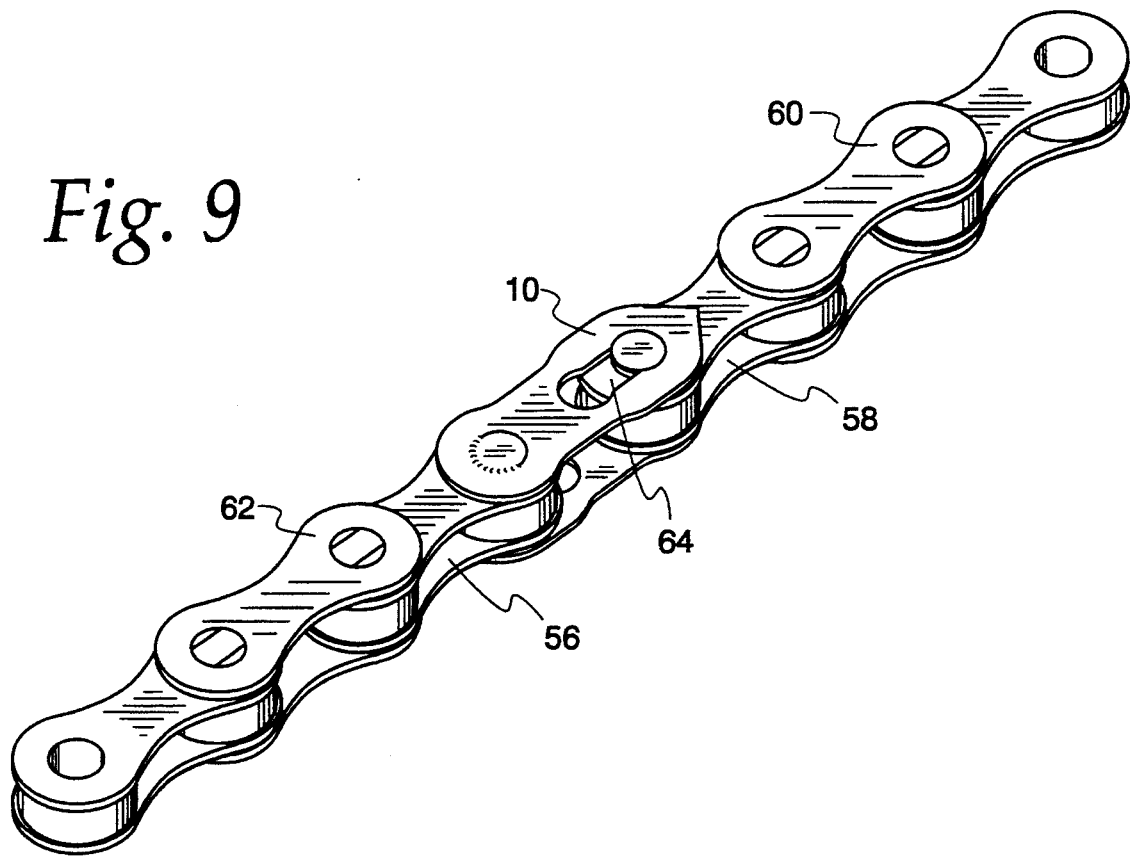
FIGS. 9 through 12 is a perspective view showing the disassembly of the master chain link in FIG. 1 to disconnect a bicycle derailleur chain.
Figure 10:
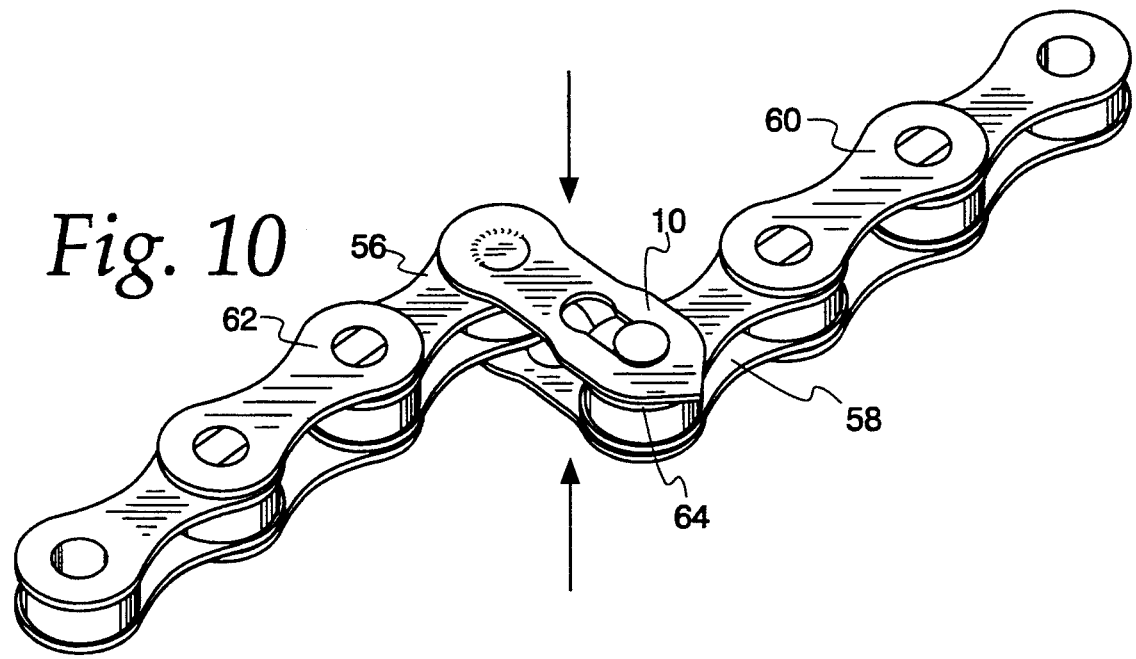
Figure 11:
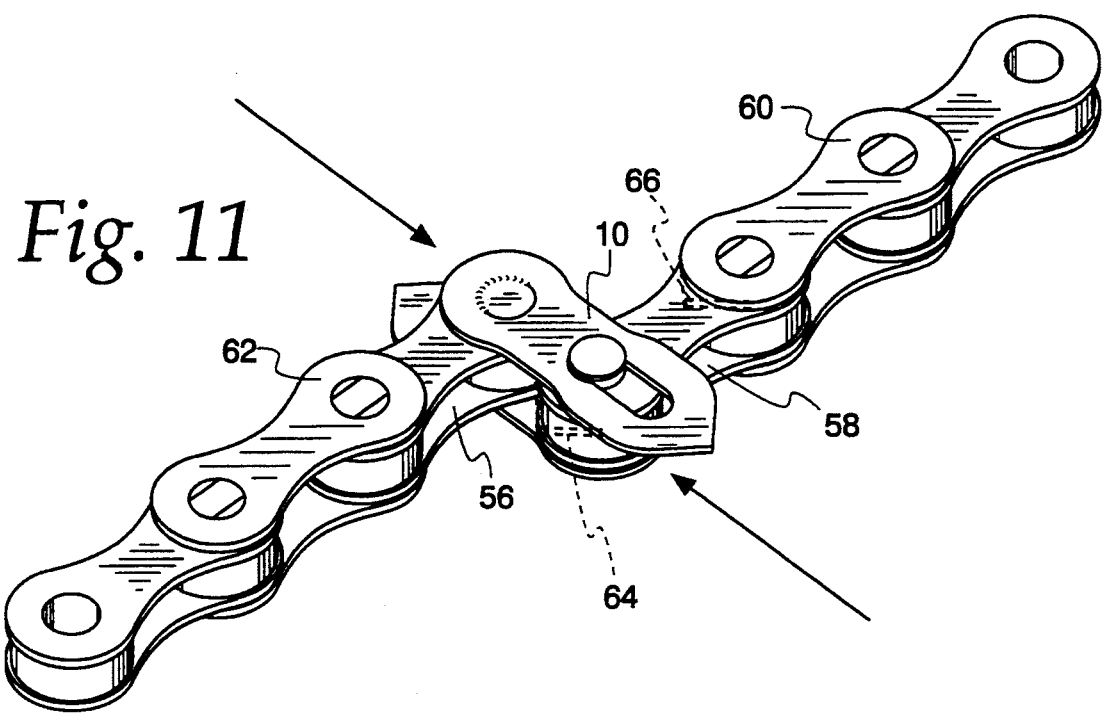
Figure 12:
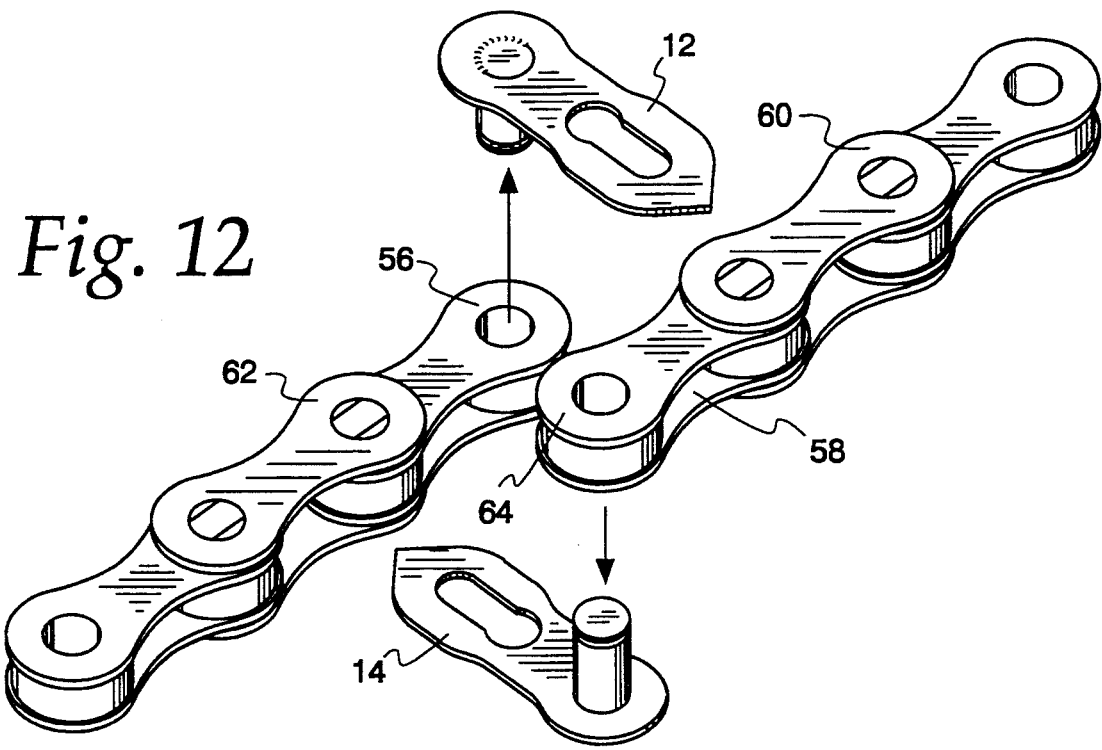

More specifically, in the event of pin tip dislodgement, the relative longitudinal movement between the plates 12, 14 and the respective pins 18, 16 is controlled by the available range of movement of the pin slotted portions 50, 40 through the respective apertures 30, 28. When the master link 10 is oriented in approximately the same direction as the two adjacent roller links 56, 58 on the bicycle chain (FIG. 9), the extensions 52, 54 are designed with such length so as to contact the respective adjacent outer pin links 60, 62 prior to movement of the pin slotted portions 50, 40 into the respective wide circular portions 44, 34. Such contact with the adjacent outer pin links 60, 62 will not occur if the master link 10 is approximately orthogonal to the adjacent roller links 56, 58 (FIG. 10). Thus, even if the pin tips 48, 38 become accidently dislodged from the respective countersinks 43, 33 while bicycle riding, the pin slotted portions 50, 40 cannot move to the respective wide circular portions 44, 34 unless the master link 10 somehow becomes oriented approximately orthogonal to the adjacent roller links 56, 58. The pointed extensions 52, 54 therefore dictate the manner in which the master link 10 may be disassembled (and assembled), Based on the foregoing features, accidental disassembly of the master link 10 is unlikely. At the same time, the master link 10 may be easily disassembled by hand without any special tools by following a few simple steps (FIGS. 9–12). First, the master link 10 is turned approximately ninety degrees relative to the adjacent roller links 56, 58, and the plates 12, 14 are laterally pushed down and toward one another to dislodge the pin tips 38, 48 from their respective countersinks 33, 43 (FIG. 10). Second, in the manner previously described, the plates 12, 14 are longitudinally pushed toward one another so that the slotted pin portions 40, 50 move longitudinally from the respective narrow circular portions 32, 42, through the respective elongated slots 36, 46, and into the respective wide circular portions 34, 44 (FIG. 11). Third, the plates 12, 14 are laterally pulled in opposite directions until the pin tips 38, 48 pass through the respective wide circular portions 34, 44 (FIG. 12). This separates the master link 10 into two disconnected, but identical, structures. Finally, the pins 16, 18 are slidably removed from the hollow cylinders of the respective adjacent roller links 56, 58 so that a chain without the master link 10 remains (FIG. 12).

To reassemble the master link 10, the above disassembly steps are performed in reverse order. Briefly, the pin 16 is inserted in the adjacent roller link 56 in one lateral direction, while the pin 18 is inserted in the adjacent roller link 58 in the opposite lateral direction (FIG. 12 with arrows reversed). Next, with the plates 12, 14 approximately orthogonal to the respective roller links 56, 58, the plate 12 is positioned over the plate 14 such that the pin tips 38, 48 are laterally aligned with the wide circular portions 34, 44. The pin tips 38, 48 are then laterally passed through the respective wide circular portions 34, 44 (FIG. 11). Finally, the plates 12, 14 are longitudinally pulled in opposite directions until the slotted portions 40, 50 slide into the respective narrow circular portions 32, 42 and the pin tips 38, 48 are positioned substantially within the respective countersinks 33, 43 (FIG. 11 with arrows reversed and then FIG. 9).

The master link 10 embodying the present invention is manufactured by conventional metal stamping techniques. As described above, the pins 16, 18 are connected to the respective plates 12, 14 by laser welding the pin heads 20, 24 to the respective plates 12, 14. The plates 12, 14 are preferably composed of high carbon tool steel, and the pins 16, 18 are precision ground.

While the present invention has been described with reference to one or more particular embodiments, those skilled in the art will recognize that many changes may be made thereto without departing from the spirit and scope of the present invention. For example, instead of providing the extensions 52, 54 on the master link 10, one or both of the adjacent roller links 56, 58 may be provided with extensions on one or both of their plates. More specifically, the inner end 64 of one or both plates of the roller link 58 may be longitudinally extended to such a length that the inner end 64 contacts the inner end of the plate of the opposing roller link 56 prior to movement of the slotted portions 40, 50 of the master link 10 into the respective wide circular portions 34, 44 (see dotted line labelled 66 in FIG. 10). A similar extension may also be provided on one or both plates of the roller link 56. Alternatively, an extension may be employed on one or both of the adjacent outer pin links 60, 62, as shown by the dotted line labeled by the reference numeral 66 in FIG. 10.

Each of these embodiments and obvious variations thereof is contemplated as falling within the spirit and scope of the claimed invention, which is set forth in the following claims.

What is claimed is:

1. A reusable master chain link for a derailleur chain, comprising:

first and second pins positioned substantially parallel to one another, said first pin having first and second peripheral heads at opposite ends thereof and said second pin having first and second peripheral heads at opposite ends thereof; and first and second elongated plates positioned substantially parallel to one another, said first and second pins extending between said first and second plates, said first and second plates having respective first and second apertures formed therein, said first and second apertures having respective narrow curvilinear portions narrower than said respective first heads of said first and second pins to prevent said respective first heads from passing therethrough, said narrow curvilinear portions having respective countersinks formed therearound for receiving and substantially concealing said respective first heads of said first and second pins, said first and second apertures having respective wide curvilinear portions wider than said respective first heads of said first and second pins to permit said respective first heads to pass therethrough to disassemble the chain link, said respective wide curvilinear portions being connected to said respective narrow curvilinear portions to permit movement of said respective first heads therebetween, said respective second heads of said first and second pins being connected to said respective second and first plates.

2. The chain link of claim 1, wherein said first and second apertures include respective elongated slots coupled between said respective narrow curvilinear portions and said respective wide curvilinear portions to permit movement of said respective first heads between said respective wide and narrow curvilinear portions via said respective elongated slots.

3. The chain link of claim 1, wherein said respective second heads of said first and second pins are integrally connected to said respective second and first plates with said respective second heads flush with outer surfaces of said respective second and first plates.

4. The chain link of claim 3, wherein said respective second heads of said first and second pins are laser welded to said respective second and first plates with said respective second heads flush with the outer surfaces of said respective second and first plates.

5. The chain link of claim 1, wherein said countersinks surround more than half the peripheries of said respective first heads to positively position said first heads in said respective countersinks.

6. The chain link of claim 1, wherein each of said first and second plates extend longitudinally between first and second ends, said first end of said first plate having an extension connected thereto preventing movement of one of said first heads from its associated narrow curvilinear portion to its associated wide curvilinear portion without rotating the chain link out of line relative to at least one adjacent interconnected roller link.

7. The chain link of claim 6, wherein said first end of said second plate includes an extension connected thereto.

8. A reusable master chain link for a derailleur chain, comprising:
   first and second pins positioned substantially parallel to one another, said first pin having first and second heads at opposite ends thereof and said second pin having first and second heads at opposite ends thereof; and
   first and second elongated plates positioned substantially parallel to one another, each of said first and second plates extending longitudinally between first and second ends, said first and second pins extending between said first and second plates, said first and second plates having respective first and second apertures formed therein for receiving said first heads of said respective first and second pins, said first and second apertures having respective narrow curvilinear portions narrower than said respective first heads of said first and second pins to prevent said respective first heads from passing therethrough, said first and second apertures having respective wide curvilinear portions wider than said respective first heads of said first and second pins to permit said respective first heads to pass therethrough to disassemble the chain link, said respective wide curvilinear portions being connected to said respective narrow curvilinear portions to permit movement of said respective first heads therebetween, said first end of said first plate having an extension connected thereto preventing movement of one of said first heads from its associated narrow curvilinear portion to its associated wide curvilinear portion without rotating the chain link out of line relative to at least one adjacent interconnected roller link, said respective second heads of said first and second pins being connected to said respective second and first plates.

9. The chain link of claim 8, wherein said first and second apertures include respective elongated slots coupled between said respective narrow curvilinear portions and said respective wide curvilinear portions to permit movement of said respective first heads between said respective wide and narrow curvilinear portions via said respective elongated slots.

10. The chain link of claim 8, wherein said respective second heads of said first and second pins are integrally connected to said respective second and first plates with said respective second heads flush with outer surfaces of said respective second and first plates.

11. The chain link of claim 10, wherein said respective second heads of said first and second pins are laser welded to said respective second and first plates with said respective second heads flush with the outer surfaces of said respective second and first plates.

12. The chain link of claim 9, wherein said narrow curvilinear portions having respective countersinks formed therearound for receiving and substantially concealing said respective first heads of said first and second pins.

13. The chain link of claim 8, wherein said first end of said second plate includes an extension connected thereto.

14. A chain assembly for a derailleur chain, comprising:
   a master chain link including first and second parallel pins, said first pin having first and second heads at opposite ends thereof and said second pin having first and second heads at opposite ends thereof, said master chain link further including first and second parallel elongated plates, said first and second pins extending between said first and second plates, said first and second plates having respective first and second apertures formed therein for receiving said respective first heads of said first and second pins, said first and second apertures having respective narrow curvilinear portions narrower than said respective first heads of said first and second pins, said first and second apertures having respective wide curvilinear portions wider than said respective first heads of said first and second pins, said respective wide curvilinear portions being coupled to said respective narrow curvilinear portions, said respective second heads of said first and second pins being connected to said respective second and first plates; and
   a roller chain link including a pair of parallel elongated plates with first and second ends and a pair of hollow cylinders connected between said plates, each of said plates of said roller link having a respective pair of apertures opening into said respective hollow cylinders, one of said pins of said master link interconnecting with one of said hollow cylinders at said first ends of said respective plates of said roller link, said first end of one of said plates of said roller link having an extension connected thereto preventing movement of said first heads of said master link from their associated narrow curvilinear portions to their associated wide curvilinear portions without rotating said master link out of line relative to said roller link.

15. A chain assembly for a derailleur chain, comprising:
   a master chain link including first and second parallel pins, said first pin having first and second heads at opposite ends thereof and said second pin having first and second heads at opposite ends thereof, said master chain link further including first and second parallel elongated plates, said first and second pins extending between said first and second plates, said first and second plates having respective first and second apertures formed therein for receiving said first heads of said respective first and second pins, said first and second apertures having respective narrow curvilinear portions narrower than said respective first heads of said first and second pins, said first and second apertures having respective wide curvilinear portions wider than said respective first heads of said first and second pins, said respective wide curvilinear portions being coupled to said respective narrow curvilinear portions, said respective second heads of said first and second pins being connected to said respective second and first plates;
   an outer pin link including first and second parallel elongated plates and a pair of parallel pins connected therebetween, each of said plates of said outer pin link having first and second ends; and a roller link interconnecting said master link and said outer pin link such that said first and second plates of said outer pin link are laterally aligned with said respective first and second plates of said master link with said first end of said first plate of said outer pin link positioned adjacent said first aperture of said first plate of said master link, said first end of said first plate of said outer pin link having an extension connected thereto preventing movement of said first heads of said master link from their associated narrow curvilinear portions to their associated wide curvilinear portions without rotating said master link out of line relative to said roller link.

16. An assembly for engagement with a substantially identical assembly to form a reusable master chain link for a derailleur chain, comprising:

a pin having first and second peripheral heads at opposite ends thereof, said first head being substantially identical to a third head of the substantially identical assembly; and an elongated plate connected to said second head of said pin, said plate having an aperture formed therein adapted to engage the third head, said aperture having a narrow curvilinear portion narrower than the third head to prevent the third head from passing therethrough, said narrow curvilinear portion having a countersink formed therearound for receiving and substantially concealing the third head, said aperture having a wide curvilinear portion wider than the third head to permit the third head to pass therethrough, said wide curvilinear portion being connected to said narrow curvilinear portion to permit movement of the third head therebetween.

17. The assembly of claim 16, wherein said aperture includes an elongated slot coupled between said narrow curvilinear portion and said wide curvilinear portions to permit movement of the third head between said wide and narrow curvilinear portions via said elongated slot.

18. The assembly of claim 16, wherein said second head of said pin is laser welded to said plate with said second head flush with an outer surface of said plate.

19. The chain link of claim 16, wherein said countersink surrounds more than half the periphery of said first head to positively position said first head in said countersink.

* * * * *

(12) EX PARTE REEXAMINATION CERTIFICATE (7650th)
United States Patent
Lickton

(10) Number: US 5,362,282 C1
(45) Certificate Issued: Aug. 3, 2010

(54) MASTER CHAIN LINK

(75) Inventor: Robert J. Lickton, Elmwood Park, IL (US)

(73) Assignee: R. L. L. Limited, Elmwood Park, IL (US)

Reexamination Request:
No. 90/010,235, Sep. 3, 2008

Reexamination Certificate for:
Patent No.: 5,362,282
Issued: Nov. 8, 1994
Appl. No.: 08/117,396
Filed: Sep. 3, 1993

(51) Int. Cl.
*F16G 15/06* (2006.01)

(52) U.S. Cl. .................. 474/220; 474/224; 59/85
(58) Field of Classification Search .......... 474/220, 474/224; 59/85
See application file for complete search history.

(56) References Cited

U.S. PATENT DOCUMENTS

| 610,583 | A | * | 9/1898 | Fox | 474/218 |
| 762,046 | A | * | 6/1904 | Gates | 474/219 |
| 3,969,949 | A | * | 7/1976 | Ohnishi | 474/230 |

FOREIGN PATENT DOCUMENTS

| TW | 122841 | 11/1989 |
| TW | 190874 | 9/1992 |

* cited by examiner

*Primary Examiner*—Jimmy T. Nguyen

(57) ABSTRACT

A reusable master chain link for a derailler chain comprises first and second parallel pins extending between first and second parallel plates. The first pin includes first and second heads at opposite ends thereof and the second pin also includes first and second heads at opposite ends thereof. The first and second plates have respective first and second apertures formed therein. The first and second apertures have respective narrow circular portions narrower than the respective first heads of the first and second pins. The narrow circular portions further include respective countersinks formed therein for receiving and substantially concealing the respective first heads of the first and second pins and substantially concealing the first heads within the respective narrow circular portions. The first and second apertures further include respective wide circular portions wider than the respective first heads of the first and second pins. The respective wide circular portions are connected to the respective narrow circular portions by an elongated slot to permit movement of the respective first heads therebetween. The respective seconds heads of the first and second pins are integrally connected by laser welds to the respective second and first plates.

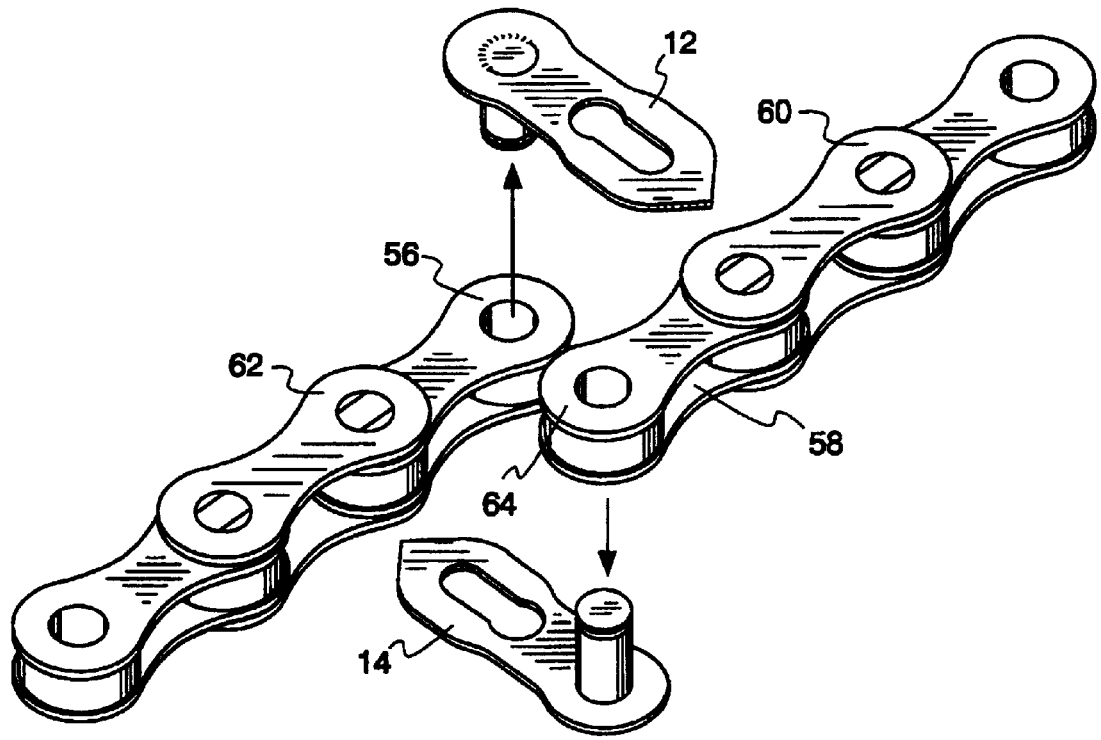

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 and 16-19 are cancelled.
Claims 6-15 were not reexamined.

* * * * *